United States Patent [19]

Kicko-Walczak et al.

[11] Patent Number: 5,719,213
[45] Date of Patent: Feb. 17, 1998

[54] AUXILIARY AGENT FOR PROCESSING PLASTICS, A METHOD FOR PREPARING THE AGENT AND A METHOD FOR PRODUCING UNSATURATED POLYESTER RESINS CHARACTERIZED BY SUPRESSED VAPORIZATION OF THE MONOMER COMPONENT

[75] Inventors: Ewa Kicko-Walczak; Edward Grzywa; Wojciech Wojdak, all of Warsaw; Tadeusz Jakubas, Nowa Sarzyna; Maria Szczepanowska, Nowa Sarzyna; Zdzislaw Mental, Nowa Sarzyna; Barbara Krawczyk, Nowa Sarzyna, all of Poland

[73] Assignee: Instytut Chemii Przemyslowei, Poland

[21] Appl. No.: 788,052

[22] Filed: Jan. 23, 1997

Related U.S. Application Data

[63] Continuation-in-part of Ser. No. 406,890, filed as PCT/PL94/00017, Aug. 18, 1994, abandoned.

[30] Foreign Application Priority Data

Aug. 18, 1993 [PL] Poland ..................... 300130
Sep. 24, 1993 [PL] Poland ..................... 300484

[51] Int. Cl.$^6$ ............................ C08L 67/06; C08L 63/02
[52] U.S. Cl. ........................ 523/508; 523/511; 523/514; 524/210; 524/230; 524/315; 524/318; 524/400; 525/31; 525/54.42; 525/111; 525/533

[58] Field of Search ......................... 523/508, 511, 523/514; 524/230, 210, 400, 318, 315; 525/54.42, 533, 31, 111

[56] References Cited

FOREIGN PATENT DOCUMENTS 475260   3/1992   European Pat. Off. .
141789   4/1988   Poland .

OTHER PUBLICATIONS

Chem Abs 57466, vol. 112, No. 8, Feb. 19, 1990.
Chem Abs 21754, vol. 112, No. 4, Jan. 22, 1990.

Primary Examiner—Patricia A. Short
Attorney, Agent, or Firm—Bauer & Schaffer

[57] ABSTRACT

The present invention relates to an auxiliary agent for use in the synthesis of unsaturated polyester resins comprising a compound of the general formula

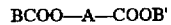

BCOO—A—COOB' and at least one compound selected from the group consisting of fatty acid amides, fatty acid divalent metal salts and their mixtures, whereby styrene emissions from unsaturated polyester resins are suppressed.

14 Claims, No Drawings

AUXILIARY AGENT FOR PROCESSING PLASTICS, A METHOD FOR PREPARING THE AGENT AND A METHOD FOR PRODUCING UNSATURATED POLYESTER RESINS CHARACTERIZED BY SUPRESSED VAPORIZATION OF THE MONOMER COMPONENT

RELATED APPLICATION

This is a continuation-in-part of U.S. patent application No. 08/406,890, filed Mar. 20, 1995 which is a 371 of PCT/PL94/00017, filed Aug. 18, 1994.

BACKGROUND OF THE INVENTION

The present invention relates to an auxiliary agent for processing plastics and to a method for preparing the agent and to a method for producing unsaturated polyester resins which are characterized by suppressed vaporization of the monomer component and are used particularly for preparing polyester-glass laminates.

The present invention relates to a method for preparing an auxiliary agent and comprises chemical synthesis of the major constituent and the composition of the mixture comprising this constituent and amide(s) and/or divalent metal salts of higher fatty acids and/or esters of fatty acids and/or polyethylene waxes.

Processing of plastics involved hydroxy esters or epoxy esters used as slip agents, which usually have either low melting points or high melting points but low compatibility with plastics.

Polish Patent Nos. 121,438 and 125,545 show hydroxy esters with slip-agent properties which are used as additives to suppress the vaporization of styrene from unsaturated polyester resins. These well-known hydroxy esters constitute products of addition of long-chained fatty acids to epoxy compounds, mainly diane epoxy resins. They are characterized by limited solubility in organic solvents and, therefore, cannot be used in the processing of plastics in the convenient form of concentrated solutions prepared in organic solvents.

More soluble in organic solvents, primarily in aromatic hydrocarbons, are the auxiliary agents that have been disclosed in Polish Patent Nos. 141,789 and 141,790. These agents are epoxy esters which constitute products of addition of long-chained fatty acids and gum rosin acids to epoxy compounds.

A drawback to the inventions referred to is the necessity for adding, in addition to major components, paraffin, m.p. 45°–60° C., to aid the components to perform the principal function, viz., to substantially suppress the vaporization of styrene from unsaturated polyester resins while the resins are being processed under commercial processing conditions. This function is also associated with the reduction of the interlayer adhesion of polyester-glass laminates, especially when the laminates are produced by the wet-on-dray method, which is observed upon prolonged use of the laminates thus prepared in boat-building and shipyard industries.

Surprisingly, it was found that styrene emission from unsaturated polyester resins can be efficiently suppressed by the use of an auxiliary agent which constitutes a mixture comprising compounds of the general formula BCOO—A—OOCB', where A stands for the group having the general formula

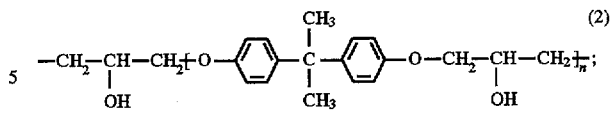

B stands for the group $CH_3(CH_2)_x$, where x=11–23, and B' stands for the group formed by abstracting hydrogen from the molecule of rosin constituting a mixture of abietic, levopimaric, neoabietic and palustric acids, and also an amide and/or divalent metal salts of fatty acids and/or esters of fatty acids and/or polyethylene waxes of molecular weight of 300–5,000 added in the amounts of 2 to 50 parts of amide and/or divalent metal salts of long-chained fatty acids and/or an ester of a fatty acid and/or polyethylene waxes per 100 parts of the BCOO—A—OOCB' compound, where A, B and B' have the meanings as defined above.

The auxiliary agents according to the present invention are both compatible in unsaturated polyester resins and soluble in organic solvents. They effectively suppress styrene emissions and do not detract from the mechanical properties of polyester-glass laminates, and particularly they do not distort the interlayer adhesion in these laminates.

The auxiliary agents according to the present invention are prepared by the reaction of addition of a rosin and a compound $CH_3(CH_2)_xCOOH$, wherein x=11–23, to an epoxy resin. The reaction is run at an elevated temperature in the presence of an amine catalyst. Next are added amides and/or divalent metal salts of $C_{11}$–$C_{18}$ fatty acids and/or polyethylene waxes of molecular weights 300–5,000.

The group of compounds of the general formula $CH_3(CH_2)_xCOOH$ includes saturated fatty acids of which stearic acid and lauric acid are used preferably. Unsaturated, instead of saturated, fatty acids can also be used, preferably oleic acid.

As epoxy resins there are used mainly diane epoxy resins with epoxy numbers of 0.21 to 0.51. Aliphatic epoxy resins and glycidyl esters can be used, e.g. 1,4-butanediol diglycidyl ether, diethylene glycol diglycidyl ether, and glycidyl methacrylate.

As amides of fatty acids, ethylenedistearamide is mainly used.

As fatty acid derivatives and divalent metal salts most frequently lead, calcium and zinc salts of stearic acid are used.

As esters of higher fatty acids, stearin is mainly used.

As polyethylene waxes, hydrocarbons of molecular weights of 300 to 5,000 are used.

In the method according to the present invention reactants may be added in any order of sequence; the compound of the general formula BCOO—A—OOCB' is obtained by maintaining the weight ratio of fatty acids to rosin at a value of 0.1:1.0 to 5.0:1.0.

The ratio of the amount of epoxy resin to the total amount of fatty acids and rosin is fixed, while maintaining the ratio of the epoxy number of the epoxy compounds to the carboxylic groups, at a value within the range of 0.50:1.0 to 1.5:1.0.

The auxiliary agents endowed with a set of preferred properties are prepared by mixing and melting the compound BCOO—A—OOCB' with 2 to 50 weight parts of an amide and divalent metal salts of fatty acids and/or an ester of a fatty acid and/or polyethylene waxes of molecular weights of 300–5,000. Paraffin added in amounts of 0.1 to 7.0 weight part to the resulting composition has entirely suppressed the vaporization of styrene from an unsaturated polyester resin, which was examined under laboratory conditions in 1 h after the composition had been added.

Surprisingly, it was found that unsaturated polyester resins can be prepared that are characterized by very low styrene emissions. These resins can be used to produce polyester-glass laminates exhibiting very good interlayer adhesion even if subsequent laminate layers are laid up 7 to 14 days after the prior layer has been formed and cured, provided the unsaturated polyester resin contains a suitably selected mixture of compounds.

Such a composition mixture is characterized by a good and long-lasting stability with no tendency of the modifiers to demix from the solution as has been found to occur in prior art approaches. Furthermore, the composition can be used for both unsaturated polyester ortho-phthalic and isophthalic resins and also vinyl ester type resins.

In the method according to the present invention, to 100 weight parts of an unsaturated polyester resin is added 0.05–5.0 weight parts and preferably 0.5–2.0 weight parts of a mixture comprising compounds of the general formula BCOO—A—OOCB', in which A designates the group of the general formula

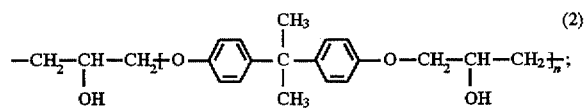

B designates the group $CH_3(CH_2)_x$ in which $x=11-23$ and B' designates the group formed by abstracting a hydrogen from the molecule of rosin constituting a mixture of abietic, levopimaric, neoabietic and palustric acids, an amide, and/or divalent metal salts of fatty acids and/or esters of fatty acids and/or polyethylene waxes of molecular weights of 300–5,000 used in amounts of 2 to 50 weight parts of the amide and/or divalent metal salts of long-chained fatty acids and/or an ester of a fatty acid and/or the polyethylene waxes per 100 weight parts of the compounds of the general formula BCOO—A—OOCB', in which A, B and B' have the meanings defined hereinbefore.

The auxiliary agents according to the present invention are well compatible with unsaturated polyester resin and soluble in organic solvents.

A particularly advantageous mode of addition of the additives makes use of the fact that these additives are well soluble in organic solvents including xylene, toluene, white spirit and mixtures thereof and thus can be added to polyester resins in the form of a paste containing the modifiers at high concentrations, even as high as 90 weight percent. The additives proposed are also compatible with all well-known polyester resins with no tendency of demixing to occur on prolonged storage.

The additives introduced into polyester resins are produced by the reaction of addition, run at an elevated temperature and in the presence of an amine catalyst, of the compounds of the general formula $CH_3(CH_2)_xCOOH$, $x=11-23$, and rosin to an epoxy resin, followed by addition of an amide and/or divalent metal salts of $C_{11}$–$C_{18}$ fatty acids and/or ester of fatty acids and/or polyethylene waxes of molecular weight of 300–5,000.

In the method according to the present invention unsaturated polyester resins include styrene as the major crosslinking monomer component; however, the additives described can also be added to the unsaturated polyester resins containing such crosslinking monomers as, for example, styrene derivatives, acrylic oligo-esters and methacrylic oligo-esters, as individual species or as blends thereof.

Unsaturated polyesters constituting these resins include maleic or fumaric acid residues and glycol residues, e.g. ethylene glycol, diethylene glycol, 1,2 propylene glycol, dipropylene glycol, 1,3-butylene glycol, neopentyl glycol, dibromoneopentyl glycol and chloromethylethylene glycol, and 2,2-di(p-hydroxypropoxyphenyl)propane, epichlorohydrins and dicarboxylic acid residues, e.g., phthalic, isophthalic, terephthalic, adipic and sebacic acid residues, and also acids, i.e. derivatives of diene adducts of maleic anhydride to cyclopentadiene, hexachlorocyclopentadiene, β-naphthol or anthracene and maleopimaric acid residues.

Unsaturated polyester resins according to the present invention can also include some well-known additives like inhibitors, e.g. hydroquinone; thixotroping agents, e.g. active silica; flame retardants, e.g. pentabromoethylbenzene; mineral fillers, e.g. chalk, kaolin, talc or glass fiber chopped strands; thickeners, e.g. magnesium oxide; and smoke suppressants.

The resins are cured by well-known techniques, especially after having been impregnated with glass fiber in the form of woven cloth, mat or roving, by using peroxide or hydroperoxide curing agents with accelerators added, e.g. tertiary aliphatic-aromatic amines or cobalt or vanadium compounds. Curing can also be carried out by the well-known methods of involving ultraviolet or visible irradiation by using appropriate sensibilizers or by using gamma rays or electron beams.

The essential advantage of the method according to the present invention involves suppression of styrene emission from the processed polyester resins to a minimum, very good solubility of the modifiers in all well-known organic solvents and, in the first place, the possibility of preparing polyester-glass laminates by any method including the wet-on-dry method.

EXAMPLE I

In a reactor equipped with a stirrer, cooler and thermometer, an Epidian 5 diane epoxy resin (epoxy value, 0.52), 70.0 g was heated at a temperature of 130° C. with rosin, 45.0 g, and stearic acid, 44.0 g, in the presence of 0.3 g of triethanolamine used as catalyst. The reaction was continued for 3 h until the acid number attained a value of 10 mg KOH/g. To the reaction product ethylenedistearamide, 32.0 g, and a polyethylene wax ($\overline{M}_n=1,000$), 16.5 g, were added at a temperature of 55° C. After having been cooled, the resulting composition became solid, m.p. 46° C.

EXAMPLE II 1.4-Butanediol diglycidyl ether, 100.0 g, was heated with oleic acid, 75.0 g, and rosin, 80.0 g, in the present of 0.5 g of triethanolamine at a temperature of 110° C. The reaction was continued for 2 h until the acid number attained a value of 8 mg KOH/g. To the reaction product stearin, 45.0 g, ethylenedistearamide, 15.0 g, and a polyethylene wax ($\overline{M}_n=400$), 15.0 g, were added at a temperature of 50° C. The resulting mixture was dissolved in 120.8 g of xylene. After having been cooled, the composition had a consistency of a paste which did not sediment on storing.

EXAMPLE III

A 2,2-bis(4-hydroxyphenyl)propane-epichlorohydrin epoxy resin (epoxy value, 0.35), 35.2 g, was heated with stearic acid, 16.5 g, and rosin, 15.2 g, in the present of triethanolamine for 5 h at a temperature of 150° C. In 5 h, the reaction product had an acid number of 3 mg KOH/g. To this product ethylenedistearamide, 32.5 g, and a polyethylene wax ($\overline{M}_n=400$), 35.8 g, were added at a temperature of 60° C. After having been cooled, the composition had an m.p. of 39° C. and was compatible in the polyester resin with no signs of turbidity produced.

EXAMPLE IV

Diethylene glycol diglycidyl ether, 100 g, was heated with rosin, 78.5 g, and stearic acid, 65.7 g, in the present of 0.3 g triethanolamine at a temperature of 120° C. After the acid number attained the value of 5 mg KOH/g, ethylenedistearamide, 20.0 g, a polyethylene wax ($\overline{M}_n$=1,000), 38.0 g, and a glycerol monostearate-calcium stearate mixture, 15.7 g, were added at a temperature of 55° C. After having been cooled the composition had a m.p. of 41° C. and was readily soluble in aromatic hydrocarbons.

EXAMPLE V

A 2,2-bis(4-hydroxyphenyl)propane-epichlorohydrin resin (epoxy value, 0.40), 100.0 g, was heated with stearic acid, 75.2 g, and rosin, 42.2 g, in the presence of 0.3 g of triethanolamine for 3 h at a temperature of 120° C. To the molten reaction product ethylenedistearamide, 32.0 g, and a polyethylene microwax, 16.5 g, were added and the mixture was dissolved, 10.3 g, in 1000 g of a maleic(fumaric)-phthalic-propylene polyester resin containing 33 wt. % of styrene. The solution was poured into a Petri dish, surface area 95 cm², lateral wall 10 mm high, and the dish was placed in an air stream flowing at a rate of 0.4 m/s at a temperature of 22° C. The dish was weighed before the start of the vaporization text and in 60 minutes after the test had been started. A parallel test was carried out, for the purposes of comparison, with the resin containing no additive.

The efficiency (E,%) of the additive is evaluated as $$E = \frac{m_o - m}{m_o} \times 100\%$$

where $m_o$ and m are the losses in weight of the resin containing no additive and the one containing the additive, respectively.

In this Example, the efficiency was found to be E=99.8%.

Interlayer adhesion is evaluated visually on a joint formed between a glass mat and a resin layer containing no fibers by following the procedure described in Plastics Review (British Industrial Plastics) 1981, No. 11,4.

In this Example, interlayer adhesion was found to be very good: "dry" glass fibers were pulled out along the entire surface area of tear and no delamination was evident which would have left smooth sites on the separation surface. As a result, the method applied gave the highest mark, i.e. "3", on the 3-point scale of value (the second laminate layer was laid down 7 days after the first layer had been applied).

EXAMPLE VI

In a reactor equipped with a stirrer, cooler and a thermometer, an Epidian 5 diane epoxy resin (epoxy value, 0.52), 70.0 g, was heated with palmitic acid, 45.0 g, and rosin, 45.0 g, in the presence of 0.1 g of N,N'-dimethylbenzyl amine at a temperature of 130° C. until the acid number attained a value of 10 mg KOH/g. Stearin, 22.8 g, and ethylenedistearamide, 17.0 g, were added to the reaction product at a temperature of 55° C. The resulting product was dissolved in 120.0 g of xylene. After having been cooled, the composition had a pasty consistency and did not sediment on storing.

This pasty composition, 15.5 g, was dissolved in 1000 g of a maleic(fumaric)-propoxyl-2,2-bis(4-hydroxyphenyl) propane polyester resin containing 50% of styrene. The efficiency of the additive was examined as described in Example V and found to be E=99.5%.

Interlayer adhesion of the laminate prepared from the resin modified as described was examined in an impact test with the aid of a modernized DuPont impact tester. In this method the surface area of delamination of the laminate prepared at an interval of 7 days is evaluated by planimetering. This examination gave the delaminated surface area of 178 mm² vs. the 175 mm² obtained for the laminate prepared with an unmodified resin. The additive is thus seen not to detract from the adhesion of laminate layers laid down individually.

EXAMPLE VII

Diethylene glycol diglycidyl ether, 100 g, was heated with rosin, 78.5 g and stearic acid, 65.7 g, in the presence of 0.1 g of triethanolamine for 4 h at a temperature of 150° C. After the acid number had attained a value of 5 mg/KOH/g ethylenedistearamide, 20.0 g, a polyethylene wax ($\overline{M}_n$=600), 38.0 g, and a glycerol monostearate-calcium stearate mixture, 15.7 g, were added at a temperature of 50° C. After having been cooled the composition showed a m.p. of 41° C. and was readily soluble in aromatic hydrocarbons and compatible with polyester resins. The resulting composition, 15.0 g, was dissolved in 1000 g of a maleic(fumaric)-phthalic-epichlorohydrin polyester resin. The efficiency of the additive introduced was examined as described in Example V.

Interlayer adhesion was examined as described in Example V, for the laminate prepared by the wet-on-dry-method at an interval of 12 days. The laminate was giver the highest mark as per the three-point visual scale.

Various modifications and changes have been disclosed herein, and others will be apparent to those skilled in this art. Therefore, it is to be understood that the present disclosure is by way of illustrating and not limiting of the present invention.

What is claimed is:

1. A auxiliary agent for use in the synthesis of unsaturated polyester resins comprising:

a compound of the general formula

BCOO—A—OOCB'     (1), wherein A is

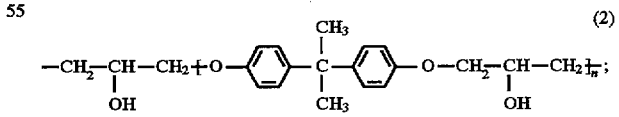

(2)

wherein n=an integer

B is

$CH_3(CH_2)_x$     (3), wherein x=11–23; and

B' is

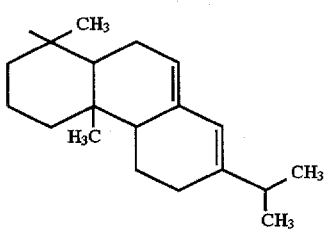

composed of a mixture of abietic, levopimaric, neoabietic and palustric acids from which a hydrogen atom has been removed; and two (2) to fifty (50) parts per 100 parts of BCOO—A—OOCB' of at least one compound selected from the group consisting of fatty acid amides, fatty acid divalent metal salts and their mixtures;

whereby styrene emissions from unsaturated polyester resins are suppressed.

2. The auxiliary agent according to claim 1, wherein the auxiliary agent includes at least one lubricating agent selected from the group consisting of higher fatty acid esters, polyethylene waxes of molecular weights of 300–5,000, and paraffin.

3. The auxiliary agent according to claim 2, wherein the higher fatty acid esters and the polyethylene wax are in the amount of 2–50 weight parts per 100 parts of BCOO—A—OOCB'.

4. The auxiliary agent according to claim 2, wherein the paraffin is in the amount of 0.1–7.0 weight parts per 100 parts of BCOO—A—OOCB'.

5. A method for producing an auxiliary agent for use in the synthesis of unsaturated polyester resins comprising the steps of:
   (a) heating at an elevated temperature an epoxy resin, a rosin, and a fatty acid of the general formula $CH_3(CH_2)_xCOOH$ wherein x=11–23 in the presence of an amine catalyst, while maintaining the weight ratio of the fatty acid to the rosin at a value of 0.1:1.0 to 5.0:1.0 and the ratio of the epoxy number of the epoxy compounds to the carboxylic groups at a value within the range of 0.5:1.0 to 1.5:1.0 for a time sufficient to produce BCOO—A—OOCB' according to claim 1; and
   (b) thereafter adding two (2) to fifty (50) parts per 100 parts of BCOO—A—OOCB' of at least one compound selected from the group consisting of fatty acid amides, fatty acid divalent metal salts and their mixtures.

6. The method according to claim 5, wherein the method further comprises a step of adding at least one lubricating agent selected from the group consisting of higher fatty acid esters, polyethylene waxes of molecular weights of 300–5,000, and paraffin.

7. The method according to claim 5, wherein the fatty acid in step (a) is a saturated fatty acid.

8. The method according to claim 7, wherein the saturated fatty acid is selected from the group consisting of stearic and lauric acids.

9. The method according to claim 5, wherein the fatty acid in step (a) is an unsaturated fatty acid.

10. The method according to claim 9, wherein the unsaturated fatty acid is oleic acid.

11. A method for preparing polyester resin glass laminates by the wet-on-dry process, comprising the step of adding to the polyester resin 0.05–5.0 parts of an auxiliary agent per 100 parts of the polyester resin, said auxiliary agent comprising a compound of the general formula:

BCOO—A—OOCB'  (1), where A is

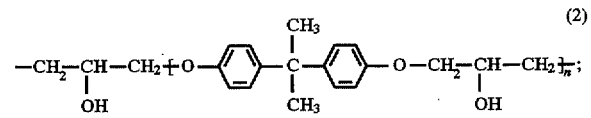

wherein n=an integer

B is $CH_3(CH_2)_x$  (3), wherein x=11–23; and

B' is

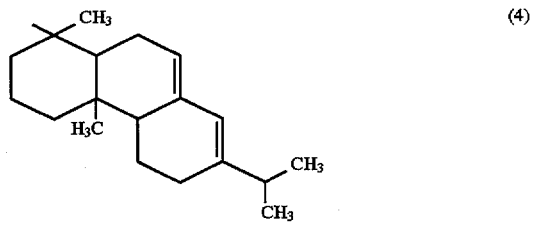

composed of a mixture of abietic, levopimaric, neoabietic and palustric acids from which a hydrogen atom has been removed; and two (2) to fifty (50) parts per 100 parts of BCOO—A—OOCB' of at least one compound selected from the group consisting of fatty acid amides, fatty acid divalent metal salts and their mixtures;

whereby styrene emissions from unsaturated polyester resins are suppressed.

12. The method according to claim 11, wherein the auxiliary agent includes at least one lubricating agent selected from the group consisting of higher fatty acid esters, polyethylene waxes of molecular weights of 300–5,000, and paraffin.

13. The method according to claim 11, wherein the mixture is added to the polyester resin in the molten state.

14. The method according to claim 12, wherein the mixture is added to the polyester resin after the mixture is dissolved in a solvent.

* * * * *

UNITED STATES PATENT AND TRADEMARK OFFICE
CERTIFICATE OF CORRECTION

PATENT NO. : 5,719,213
DATED : February 17, 1998
INVENTOR(S) : Kicko-Walczak, et al.

It is certified that error appears in the above-identified patent and that said Letters Patent is hereby corrected as shown below:

Title page, item
[57] ABSTRACT

Change line 4 from "BCOO-A-COOB'" to --BCOO-A-OOCB'--.

Signed and Sealed this

Second Day of June, 1998

Attest:

Attesting Officer

BRUCE LEHMAN
Commissioner of Patents and Trademarks